(12) United States Patent
Huang

(10) Patent No.: US 9,169,942 B2
(45) Date of Patent: Oct. 27, 2015

(54) WALL-MOUNTED FAUCET CONTROL MODULE

(75) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 366 days.

(21) Appl. No.: 13/205,976

(22) Filed: Aug. 9, 2011

(65) Prior Publication Data

US 2013/0036855 A1    Feb. 14, 2013

(51) Int. Cl.
*F16K 31/60* (2006.01)

(52) U.S. Cl.
CPC ........................ *F16K 31/60* (2013.01)

(58) Field of Classification Search
USPC ......... 74/543–548; 4/678; 137/801, 269, 359, 137/315.15, 625.41; 251/288, 323; 16/414, 16/441
IPC ............................................... F16K 5/00,31/60
See application file for complete search history.

(56) References Cited

U.S. PATENT DOCUMENTS

| 4,753,418 A * | 6/1988 | Brotcke | 251/288 |
| 5,979,489 A * | 11/1999 | Pitsch | 137/359 |
| 8,459,145 B2 * | 6/2013 | Huang | 74/543 |
| 2013/0019708 A1 * | 1/2013 | Huang | 74/490.12 |
| 2013/0036856 A1 * | 2/2013 | Huang | 74/543 |
| 2013/0087218 A1 * | 4/2013 | Huang | 137/315.15 |

FOREIGN PATENT DOCUMENTS

| JP | 57-200775 | * 12/1982 | F16K 19/00 |
| WO | WO 2010/125564 | * 11/2010 | F16K 31/60 |

OTHER PUBLICATIONS

English Abstract of JP 57-200775, Kazuhito, Dec. 1982.*

* cited by examiner

*Primary Examiner* — Vinh Luong
(74) *Attorney, Agent, or Firm* — Che-Yang Chen; Law Office of Michael Chen

(57) ABSTRACT

A wall-mounted faucet control module that can be applied to different water control valves with different sizes, includes two control handles, two transforming heads, a restricting device and a panel set, wherein detachable transforming heads and conversion block are located at the receiving space of two control handles, and the panel set has detachable adjusting sheets and positioning sleeves, The conversion block is located at the receiving space of the control handle, so that the wall-mounted faucet control module can be used for water control bases of different sizes to increase the practicability of the faucet handle and panel set, and increase the convenience in assembly process.

8 Claims, 19 Drawing Sheets

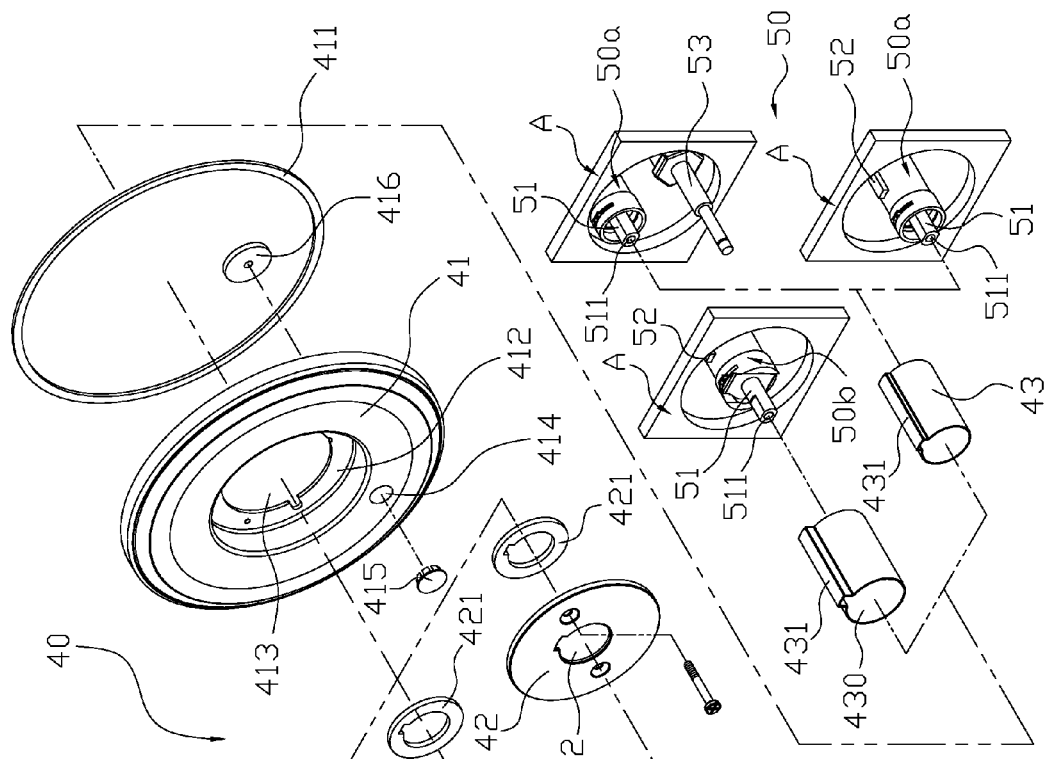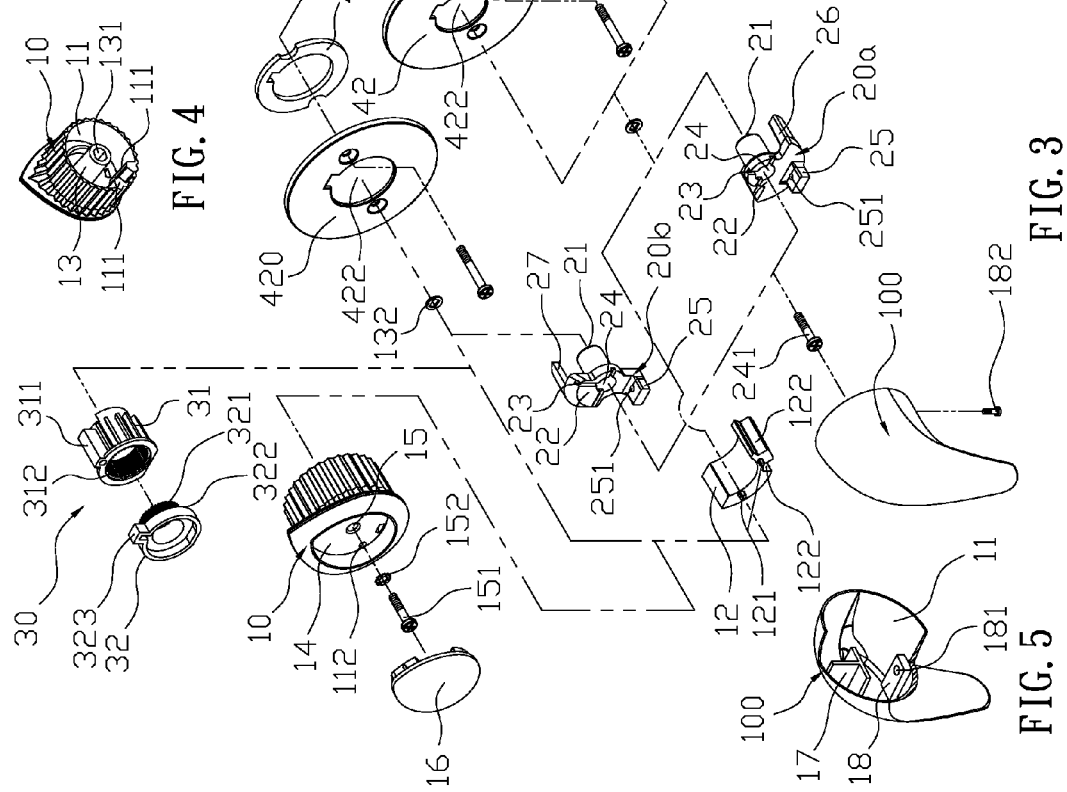

WALL-MOUNTED FAUCET CONTROL MODULE

FIELD OF THE INVENTION

The present invention relates to a wall-mounted faucet control module, and more particularly refers to a receiving space of a control handle having a detachable transforming head and conversion block, and a panel set having detachable adjusting sheets and positioning sleeves, which can be applied to different sizes of water control bases, to increase the applicability of the faucet handle and convenience for assembly.

BACKGROUND OF THE INVENTION

In recent years, the "DIY" style has become popular and people focus more on entire appearance of the faucet, so most people try to replace the faucet handle by themselves start to get rid of the appearance of the old faucet and achieve the goal of changing the exterior of the faucet and eliminating the old thereof. However, various faucets are different in sizes that cause the corresponding the faucet handles and panel sets vary in size as well, and it is difficult for customers to purchase a suitable faucet handle and panel set, which further cause a problem in assembling and replacing the faucet. This is the problem the present invention wants to solve.

SUMMARY OF THE INVENTION

The technical problem to be solved in the present invention is that various faucets are different in sizes that cause the corresponding the faucet handles and panel sets vary in size as well, and it is difficult for customers to purchase a suitable faucet handle and panel set, which further cause a problem in assembling and replacing the faucet. This is the problem the present invention wants to solve.

The technical point to solve the problem mentioned above is that the present invention provides a wall-mounted faucet control module to apply to different water control valves with different sizes, including: two control handles, one side of which recessedly forms a receiving space having two protruding ribs spacedly located at the periphery of an opening, so a conversion block can be formed to enable the control handle to apply in smaller water control valve. Two recessed slots are recessedly and spacedly formed at the periphery of the conversion block and the recessed slots are engaged with the protruding ribs of the control handle. A connecting pole is protrudingly formed at the center of the receiving space and a plugging slot is formed near the connecting pole. The other side of the control handle recessedly forms a trough that has a through hole through an opening surface of the trough and connecting to the plugging slot. The through hole has a locking unit. The receiving space of the other control handle has two protruding wedging ribs cross each other at the opening end thereof, and has a connecting block protrudingly located at the periphery of the opening end. The connecting block has a second through hole providing a second locking unit. The wall-mounted faucet control module also has two transforming heads located at the receiving space of the control handle. An inserting slot is recessedly formed at one side of the transforming heads, while a connecting surface is formed expandably at the other side. Two connecting slots cross with each other are recessedly formed at the connecting surface, and the connecting slots are engaged with the wedging ribs of the second control handle. Furthermore, a recessed slot formed at the cross point of the connecting slots connects with the inserting slot and provides a screw locking unit. The transforming heads extendedly and downward form a connecting portion that has a connecting hole therethrough, and the connecting hole is provided for the second locking unit of the second control handle to lock, wherein a stopping block is extendedly formed on both sides of the connecting portion of one transforming head, while a stopping rib is extendedly formed near the top of the inserting slot of the second transforming head. The wall-mounted faucet control module further includes a restricting device located at the receiving space of the control handle. The restricting device has a sleeve and a restricting unit, wherein the sleeve has a wedging rib protrudingly formed at the outer periphery of the sleeve, and an inner gear ring at the inner periphery of the sleeve. An outer gear ring is formed at the periphery of one end of the restricting unit and engaged with the inner gear ring. The other end of the restricting unit has a supporting surface expandably against the opening end of the sleeve, and a stopping block is protrudingly formed at the periphery of the supporting surface, wherein the stopping block is provided to be against the protruding ribs. Finally, the wall-mounted faucet control module includes a panel set having a connecting panel and a number of adjusting sheets. The connecting panel is connected to the wall surface, and has a receiving slot recessedly formed on one side with one hollow opening located at an opening surface of the receiving slot. The adjusting sheets are connected to the receiving slot of the connecting panel and have a through opening for the valve body of the control valve to go through, and the through opening is different in size for the adjusting sheets, so it can be used for valve body for control valves with different sizes. The through opening provides two positioning sleeves with different sizes to cover the valve body of the control valve. A blocking rib is protrudingly formed along the axial direction of the positioning sleeves. As such, a wall-mounted faucet control module is formed.

Comparing with conventional techniques, the present invention has the following advantages: (1) the receiving space of the control handle having detachable transforming head and conversion block, and the panel set having detachable adjusting sheets and positioning sleeves, so the faucet control module in the present invention can be used in different water control valves with different sizes to increase the practicability of the faucet handle and the panel set, and further increase the convenience during assembly; and (2) when the control handle is used for larger water control valve, the restricting device can be assembled before assembling the control handle, so that the relative position between the stopping block and the wedging rib can be adjusted by the engaging position of the outer gear ring of the restricting unit and the inner gear ring of the sleeve. When the control handle is rotated, the protruding rib can be against the stopping block of the restricting unit and the wedging rib of the sleeve to reduce the rotating angle of the control handle, and further achieve the purpose of reducing the water flow to the maximum extent. This design can also prevent the control handle from overly rotating which may cause overly high water temperature and water flow, to further achieve the goal of water saving and avoiding burns.

BRIEF DESCRIPTION OF THE DRAWINGS

FIG. 3 illustrates a three-dimensional exploded view in the present invention.

FIG. 4 illustrates a three-dimensional view of the first control handle in another angle in the present invention.

FIG. 5 illustrates a three-dimensional view of the second control handle in another angle in the present invention.

DETAILED DESCRIPTION OF THE INVENTION

Figure 1:
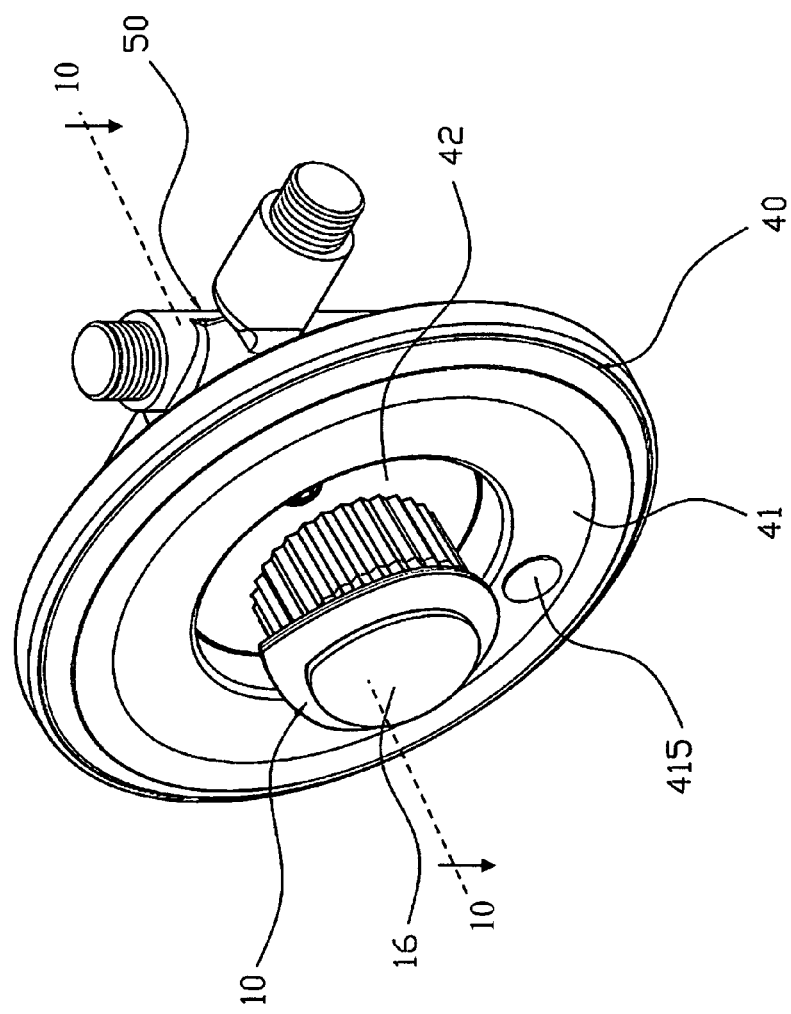
FIG. 1 illustrates a three-dimensional assembled view of the first control handle in the present invention.
Figure 2:
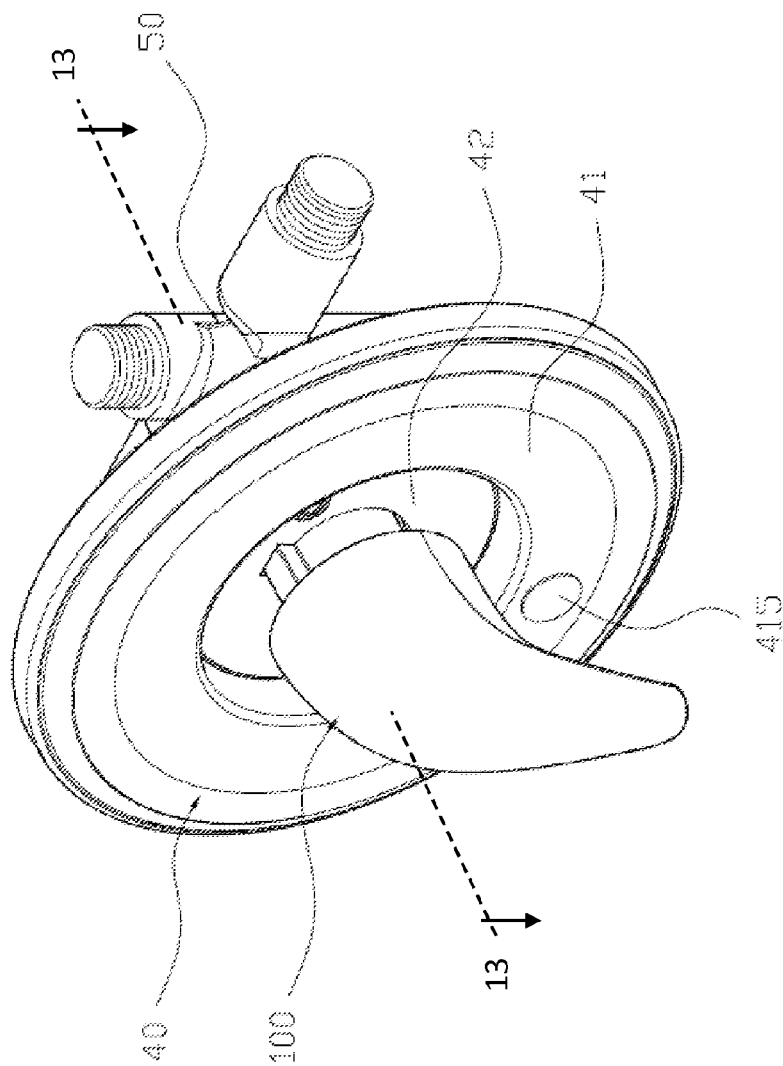
FIG. 2 illustrates a three-dimensional assembled view of the second control handle in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, a wall-mounted faucet control module, which can be used in different water control valves (50) with different sizes, includes: a first control handle (10) and a second control handle (100), a first transforming head (20a) and a second transforming head (20b), a restricting device (30) and a panel set (40), wherein one side of the two control handles (10) (100) recessedly forms a receiving space (11) and the first control handle (10)'s receiving space (11) has two protruding ribs (111) spacedly located at the periphery of an opening end, and a plurality of positioning holes (112) through the opening surface of the receiving space (11) to connect a detachable conversion block (12), so that the control handle (10) can be used for the control valve (50) with smaller size. One side of the conversion block (12) recessedly forms a plurality of positioning pole (121) that plugs into the positioning holes (112). Two recessed slots (122) are recessedly and spacedly formed at the periphery of the conversion block (20). The recessed slot (22) is engaged with the protruding rib (111) of the control handle (10). A connecting pole (13) is protrudingly formed at the center of the opening of the receiving space (11), and a plugging slot (131) that provides a gasket (132) is recessedly formed on the connecting pole (13). A trough (14) is protrudingly formed at the other end of the control handle (10), and a through hole (15) located at the opening end of the trough (14) connects through the plugging slot (131) and provides a locking unit (151) and an anti-loosening gasket (152). The trough (14) provides a cover (16) to achieve the goal of hiding the locking unit (151). The receiving space (11) of the second control handle (100) has two protruding wedging ribs (17) cross each other at the opening end of the receiving space (11). The receiving space (11) further provides a connecting block (18) protrudingly located at the periphery of the opening end of the receiving space (11). The connecting block (18) has a second through hole (181) providing a second locking unit (182). The transforming heads (20a) (20b) are located at the receiving space (11) of the second control handle (100). An inserting slot (21) is recessedly formed at one side of the transforming heads (20a) (20b), while a connecting surface (22) is formed expandably at the other side. Two connecting slots (23) cross with each other are recessedly formed at the connecting surface, and the connecting slots (23) are engaged with the wedging ribs (17) of the second control handle (100). Furthermore, a recessed slot (24) formed at the cross point of the connecting slots (23) connects with the inserting slot (21) and provides a screw locking unit (241). The transforming heads (20a) (20b) extendedly and downward forms a connecting portion (25) that has a connecting hole (251) therethrough, and the connecting hole (251) is provided for the second locking unit (182) of the second control handle (100) to lock. A stopping block (26) is extendedly formed on both sides of the connecting portion (25) of the first transforming head (20a), while a stopping rib (27) is extendedly formed near the top of the inserting slot (21) of the second transforming head (20b). The restricting device (30) located at the receiving space (11) of the first control handle (10) has a sleeve (31) and a restricting unit (32), wherein the sleeve (31) has a wedging rib (311) protrudingly formed at the outer periphery of the sleeve (31), and an inner gear ring (312) at the inner periphery of the sleeve (31). An outer gear ring (321) is formed at the periphery of one end of the restricting unit (32) and engaged with the inner gear ring (312). The other end of the restricting unit (32) has a supporting surface (322) expandably against the opening end of the sleeve (31), and a stopping portion (323) is protrudingly formed at the periphery of the supporting surface (322), wherein the stopping portion (323) is provided to be against the protruding ribs (111). The panel set (40) includes a connecting panel (41) and a number of adjusting sheets (42) (420), wherein the connecting panel (41) is mounted to a wall surface (A), and has a first gasket (411) between the wall surface (A) and the connecting panel (41) to assure tight sealing. One side of the connecting panel (41) is recessedly formed a receiving slot (412) having a hollow opening (413) at the opening surface thereof. A through opening (414) is formed near the outer periphery of the connecting panel (41), and both sides of the through opening (414) have a side cover (415) and a second gasket (416). The adjusting sheets (42) (420) are connected at the receiving slot (412) of the connecting panel (41), and a third gasket (421) is located between the adjusting sheets (42) (420) and the connecting panel (41) to assure tight sealing. The adjusting sheets (42) (420) have a through opening (422) for the valve body of the control valve (50) to go through, and the through opening (422) is different in size for the adjusting sheets (42) (420), so it can be used for valve body for control valves with different sizes. The through opening (422) provides two positioning sleeves (43) (430) with different sizes to cover the valve body of the control valve (50). A blocking rib (431) is protrudingly formed along the axial direction of the positioning sleeves (43) (430).

Referring to FIG. 3 for a practical use in the present invention, the faucet control module can connect water control valves (50a) (50b) with different sizes, wherein a valve stick (51) is protrudingly formed on the water control valves (50a) (50b), and a connecting groove (511) is recessedly formed on the valve stick (51). A stopping protruding rib (52) is formed along the axial direction at the periphery of the water control valves (50a) (50b), and one of the control valves (50a) has a switching stick (53) protrudingly formed downward.

Figure 6:
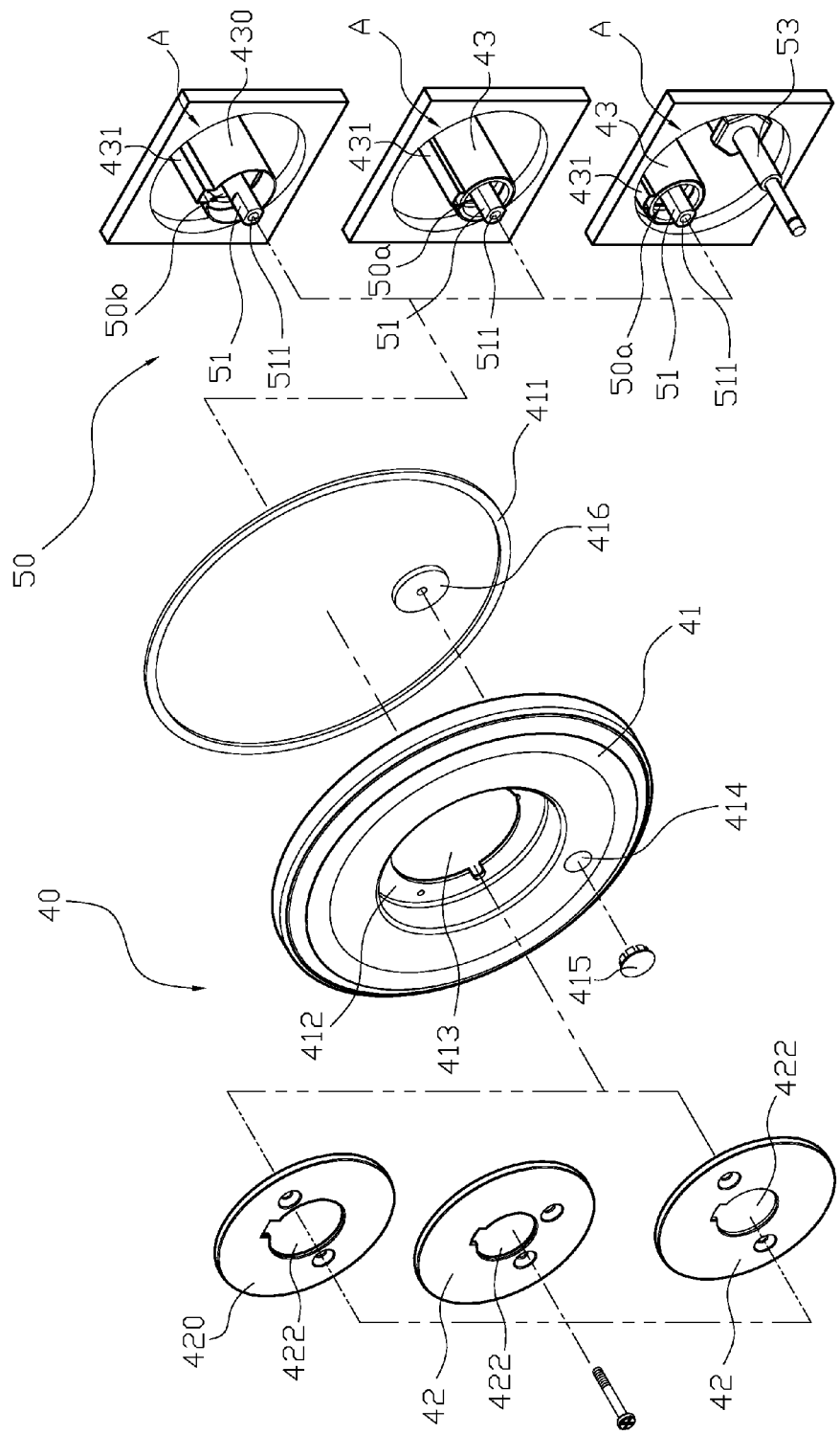
FIG. 6 shows an exploded view of the assembly of the panel set in the present invention.
Figure 7:
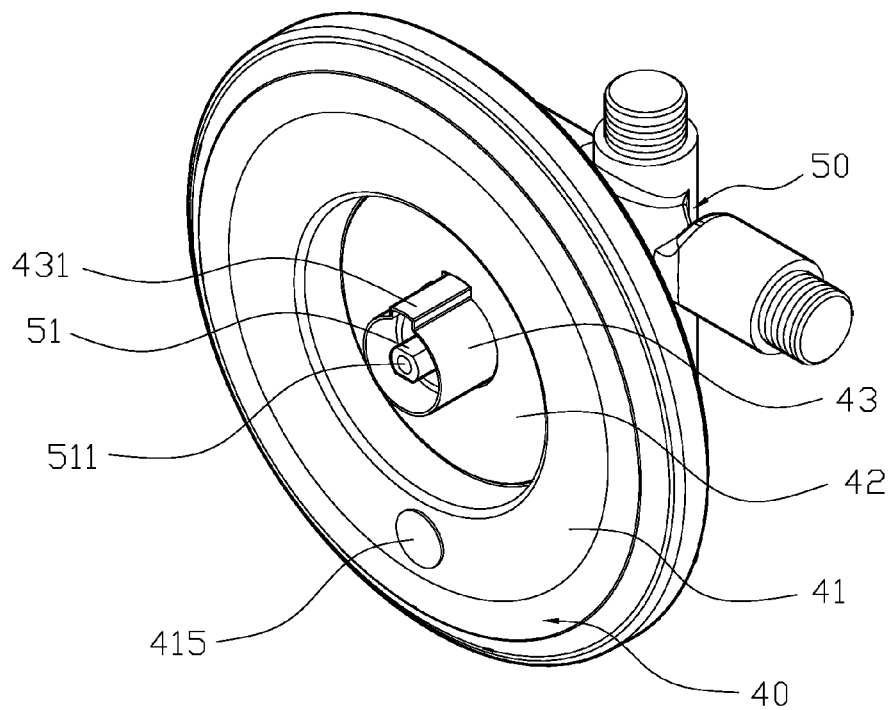
FIG. 7 illustrates a three-dimensional view of the assembly of the sleeves and the panel set in the present invention.
Figure 8:
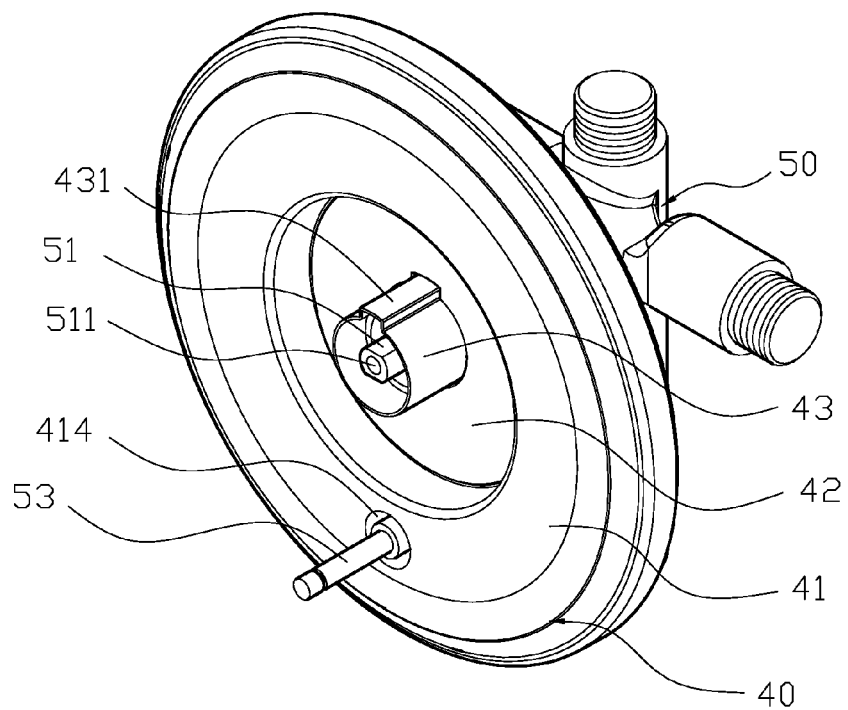
FIG. 8 illustrates a three-dimensional view of the switching stick penetrating the panel set in the present invention.
Figure 9:
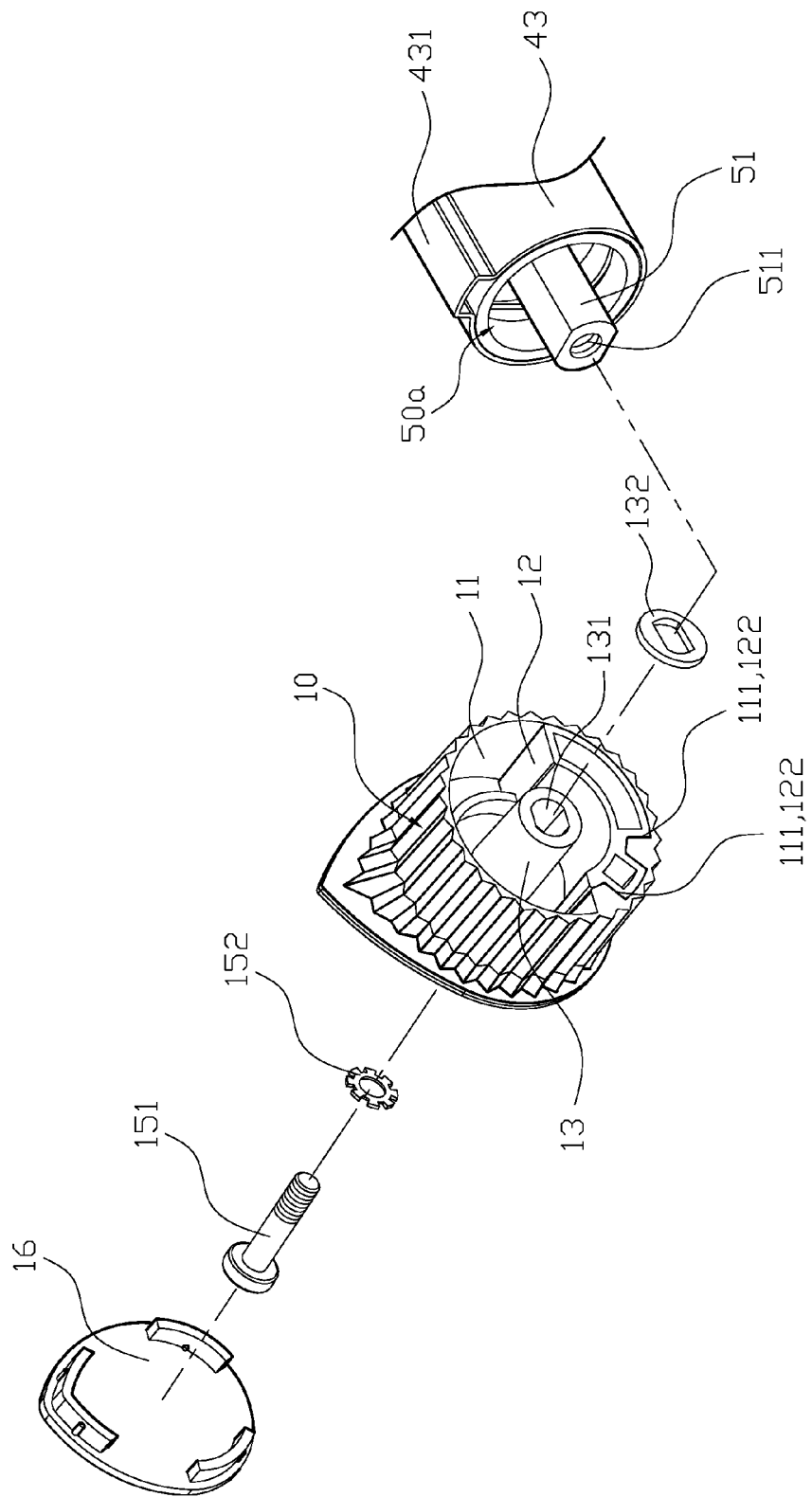
FIG. 9 illustrates an exploded view for connecting the first control handle to smaller water control valve in the present invention.
Figure 10:
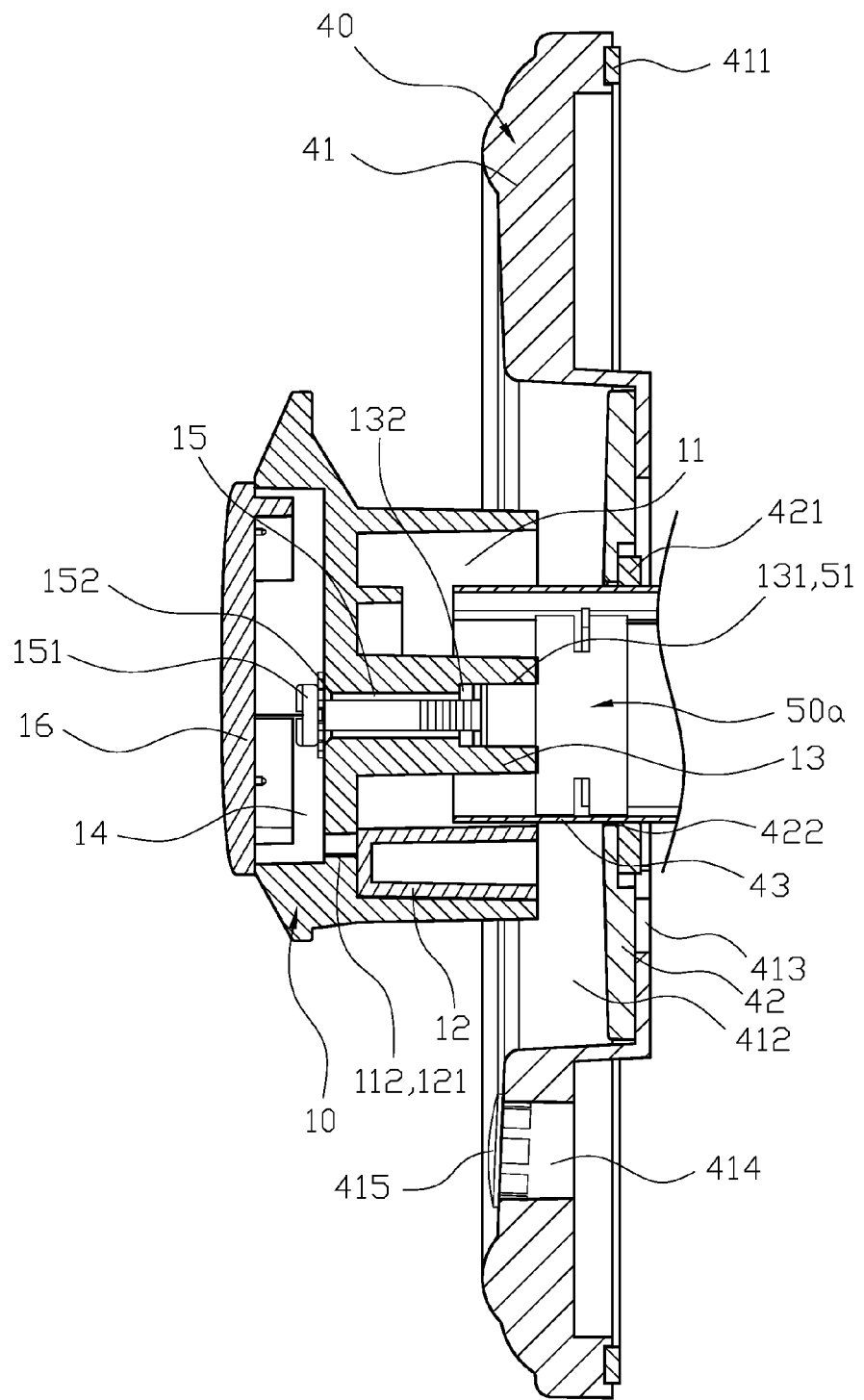
FIG. 10 illustrates a sectional view along line X-X shown in FIG. 1 of the first assembly type in the present invention.
Figure 11:
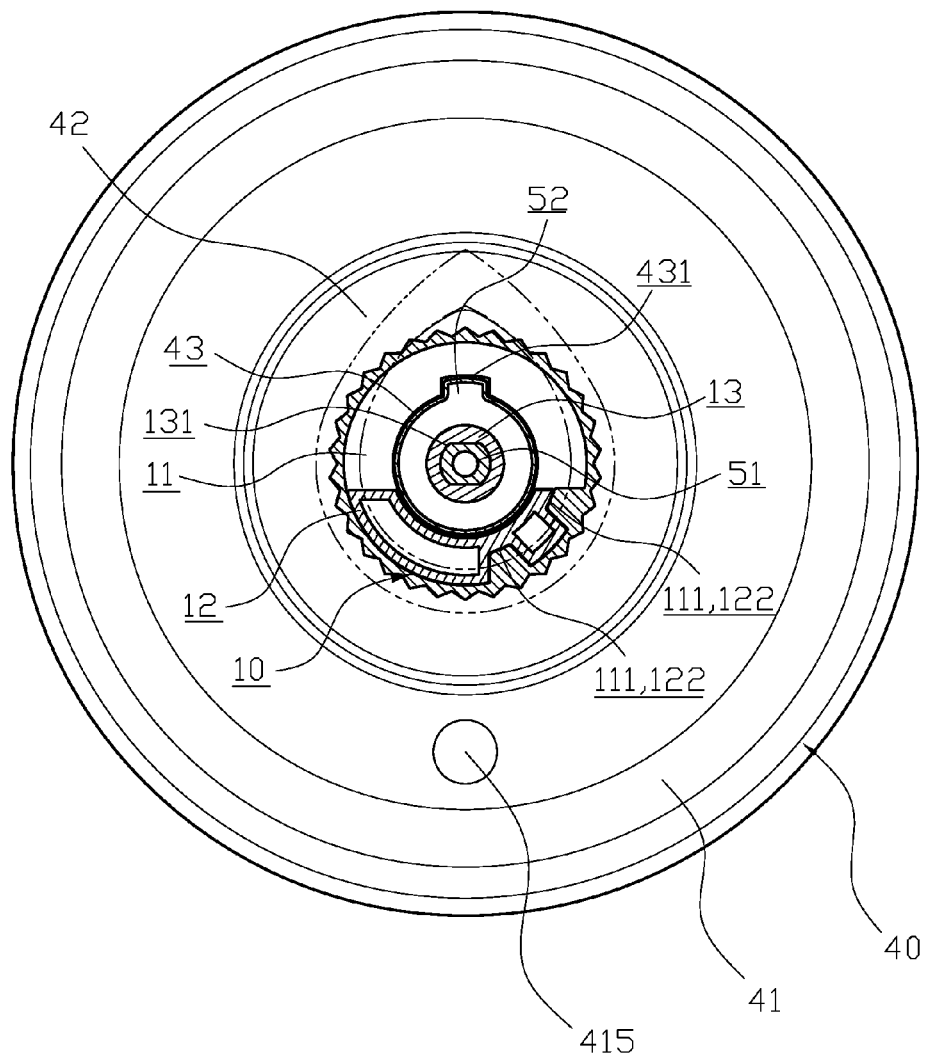
FIG. 11 illustrates a second sectional view of the first assembly type in the present invention.

Referring to FIGS. 3, 4 and 6, when the control handle (10) is configured to connect to the water control valve (50a) with smaller size, the smaller positioning sleeve (43) is used to cover the valve body of the water control valve (50a), so that the blocking rib (431) of the positioning sleeve (43) is engaged with the stopping protruding rib (52) of the water control valve (50a). Also, the hollow opening (413) covers the outer periphery of the water control valve (50a) and the smaller adjusting sheet (42) is connected to the receiving slot (412) of the connecting panel (41), such that the connecting panel (41) can be used for smaller water control valve (50a). Finally, the connecting panel (41) is mounted to the wall surface (A) to complete the assembly of the panel set (40) (see FIG. 7 as well). Furthermore, the conversion block (12) moves towards the receiving space (11) of the control handle (10) via the end of the positioning pole (121), and recessed slot (122) of the conversion block (12) slides into the protruding rib (111) of the control handle (10), so that the positioning pole (121) of the conversion block (12) can be plugged into the positioning hole (112) of the control handle (10) (see FIG. 9 as well). Also, the gasket (132) is disposed at the plugging slot (131) of the control handle (10) that is then plugged into the valve stick (51) of the water control valve (50a), and the locking unit (151) is inserted through the anti-loosening gasket (152) and the through hole (15) of the control handle (10), and is securely locked at the connecting groove (511) of the valve stick (51). The cover (16) is used to cover the trough (14) of the control handle (10) to complete the assembly for the water control valve (50a) with smaller size. When the control handle (10) is rotated, it can drive the valve stick (51) to rotate to achieve the goal of controlling the temperature of the water flow. Moreover, when the protruding rib (111) of the control handle (10) is against the blocking rib (431) of the positioning sleeve (43), it can be secured at the stopping protruding rib (52) of the water control valve (50a) to achieve the purpose of blocking (see FIG. 11 as well), so as to control the rotating angle of the control handle (10) as well as the water control valve (50a) with smaller size. Furthermore, when the water control valve (50a) has the switching stick (53) formed protrudingly downward, the side cover (415) of the connecting panel (41) can be detached from the through opening (414), so the switching stick (53) can be taken out (see FIG. 8) to increase the practicability of the panel set (40).

Figure 12:
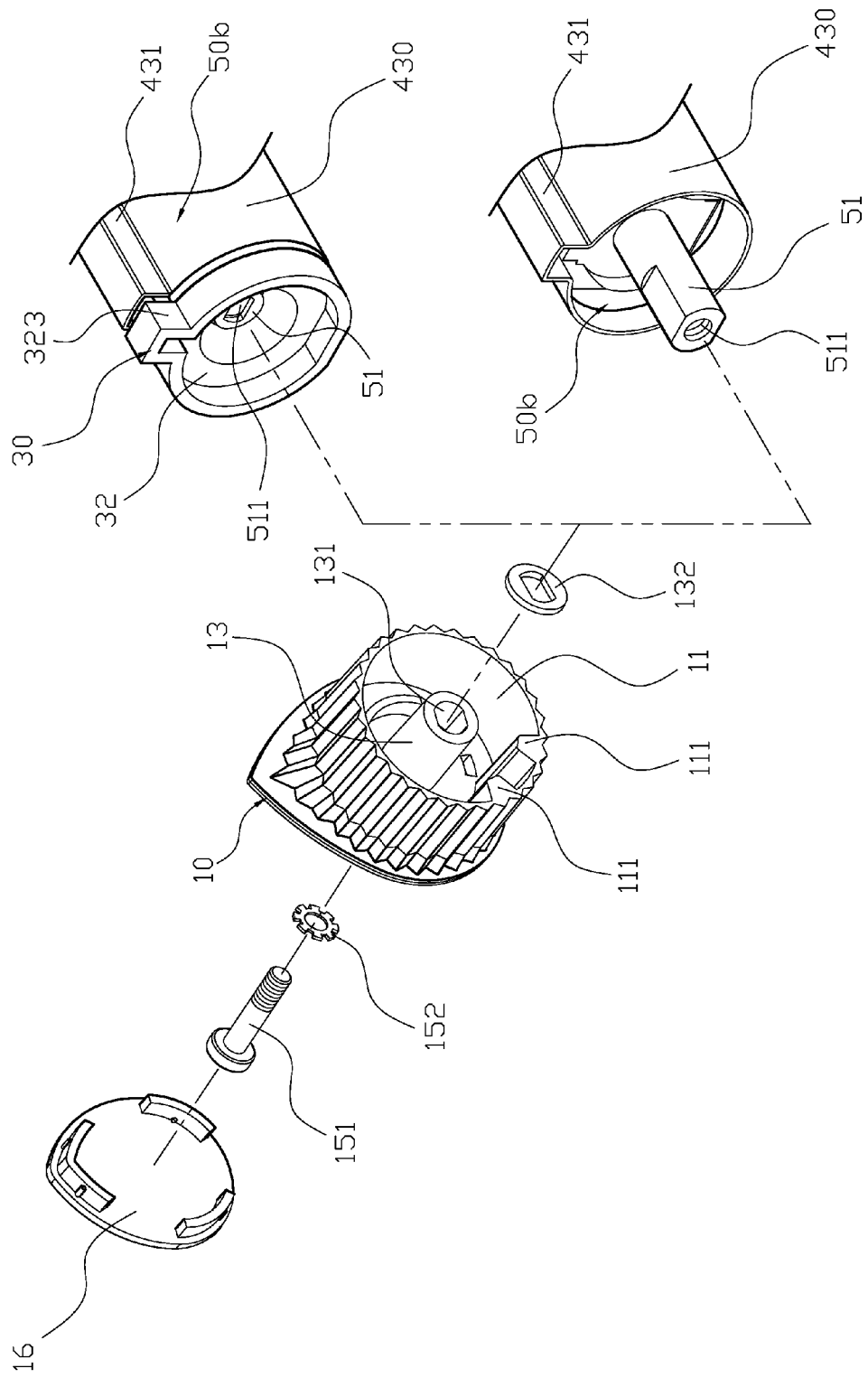
FIG. 12 illustrates an exploded view for connecting the first control handle to larger water control valve in the present invention.
Figure 13:
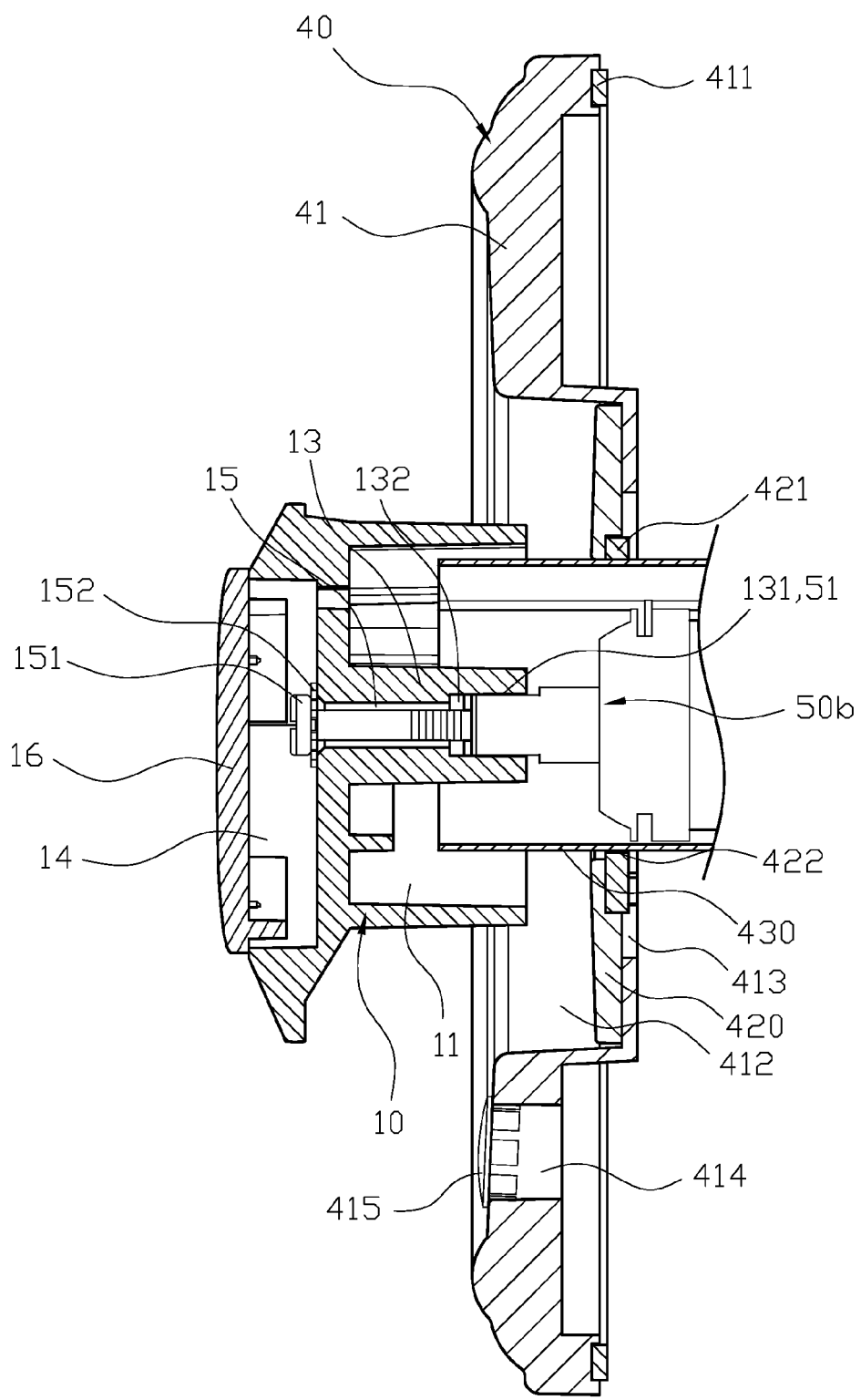
FIG. 13 illustrates a sectional view along line 13-13 shown in FIG. 2 of the second assembly type in the present invention.
Figure 14:
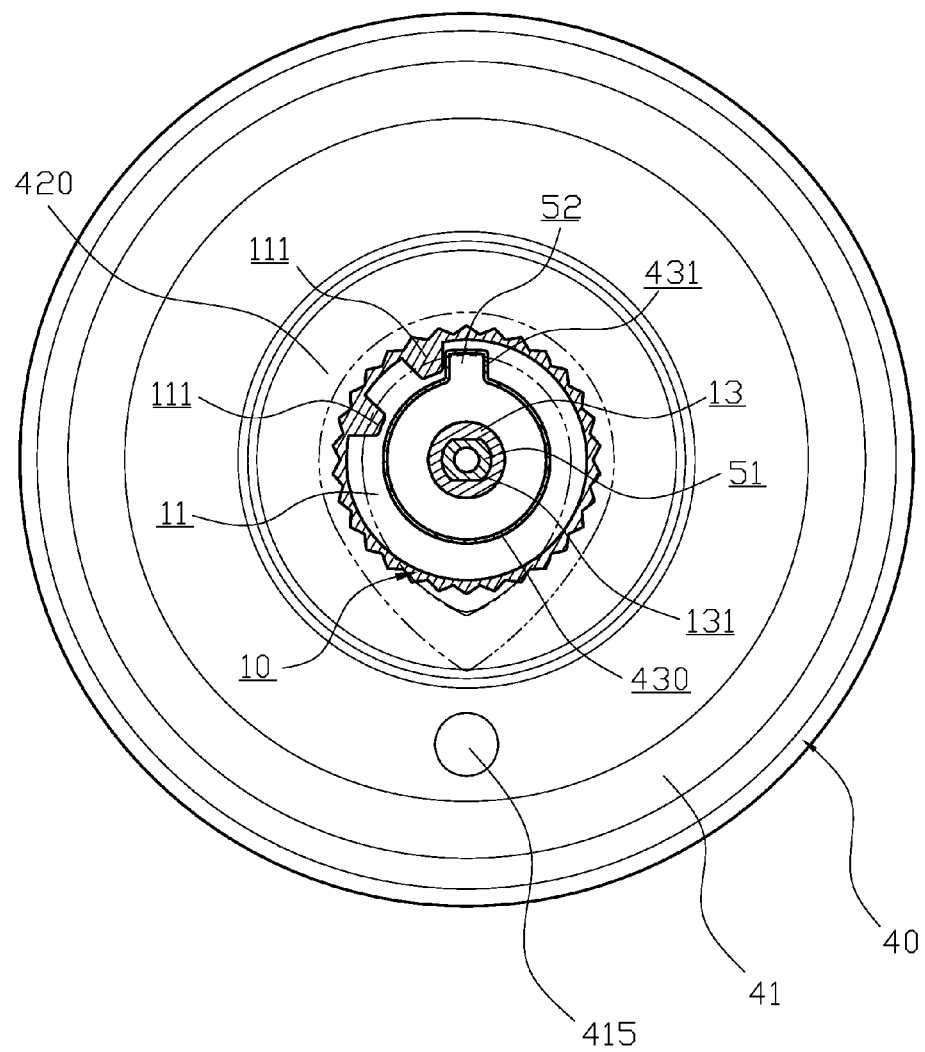
FIG. 14 illustrates a second sectional view of the second assembly type in the present invention.
Figure 15:
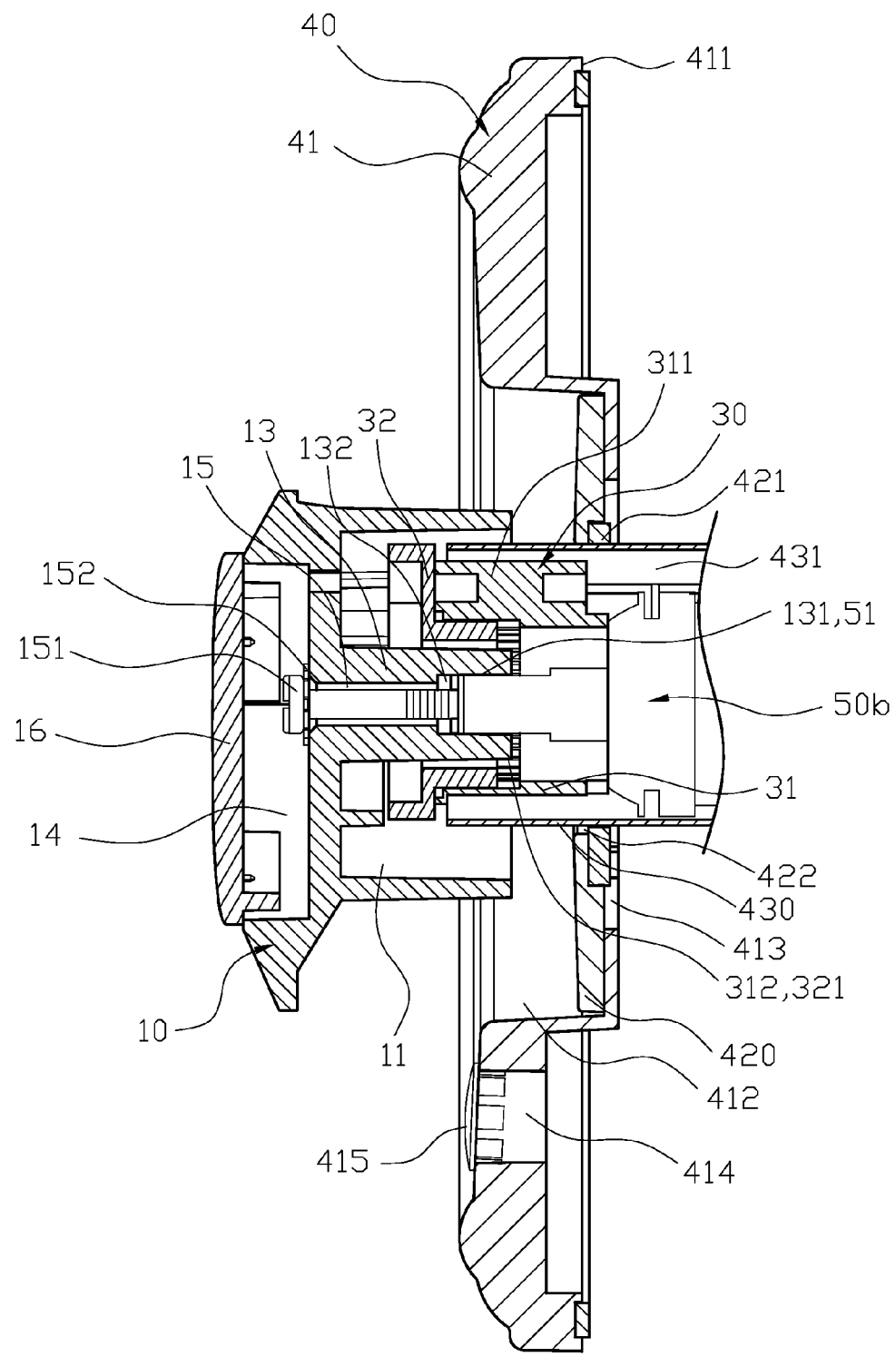
FIG. 15 illustrates a sectional view of the third assembly type in the present invention.
Figure 16:
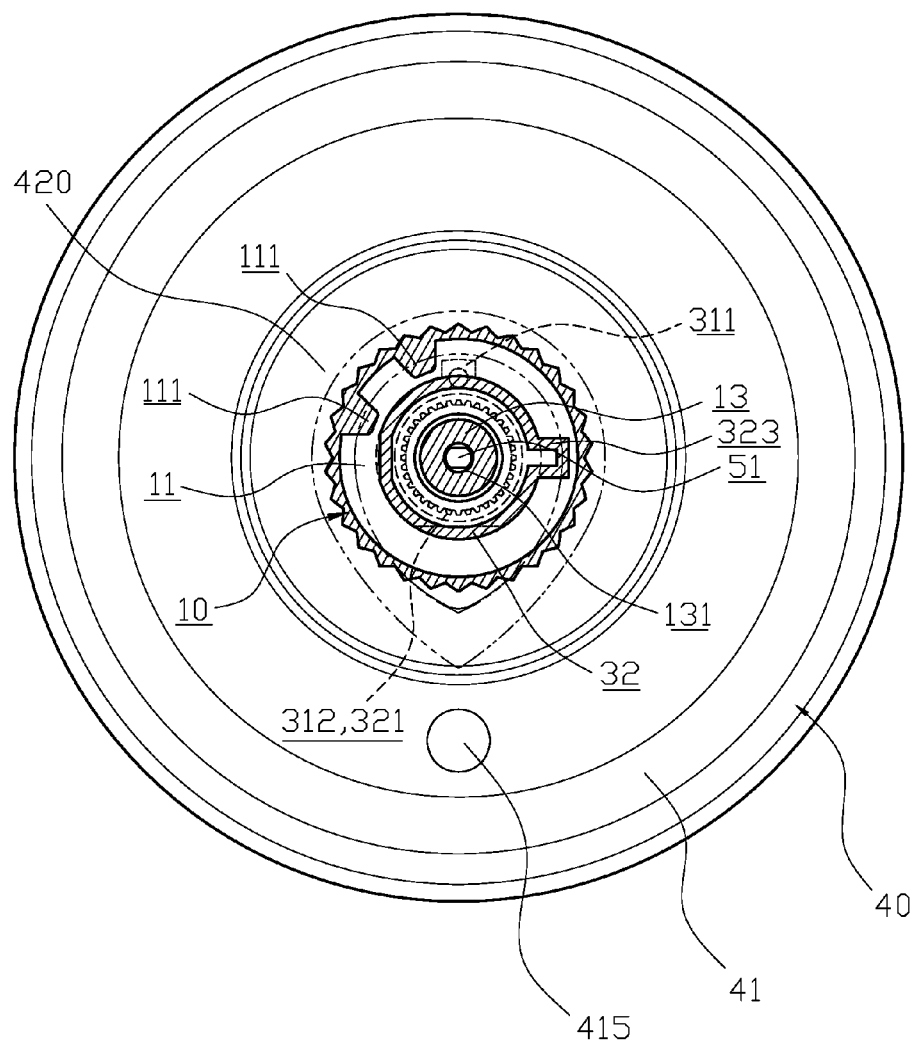
FIG. 16 illustrates a second sectional view of the third assembly type in the present invention.
Figure 17:
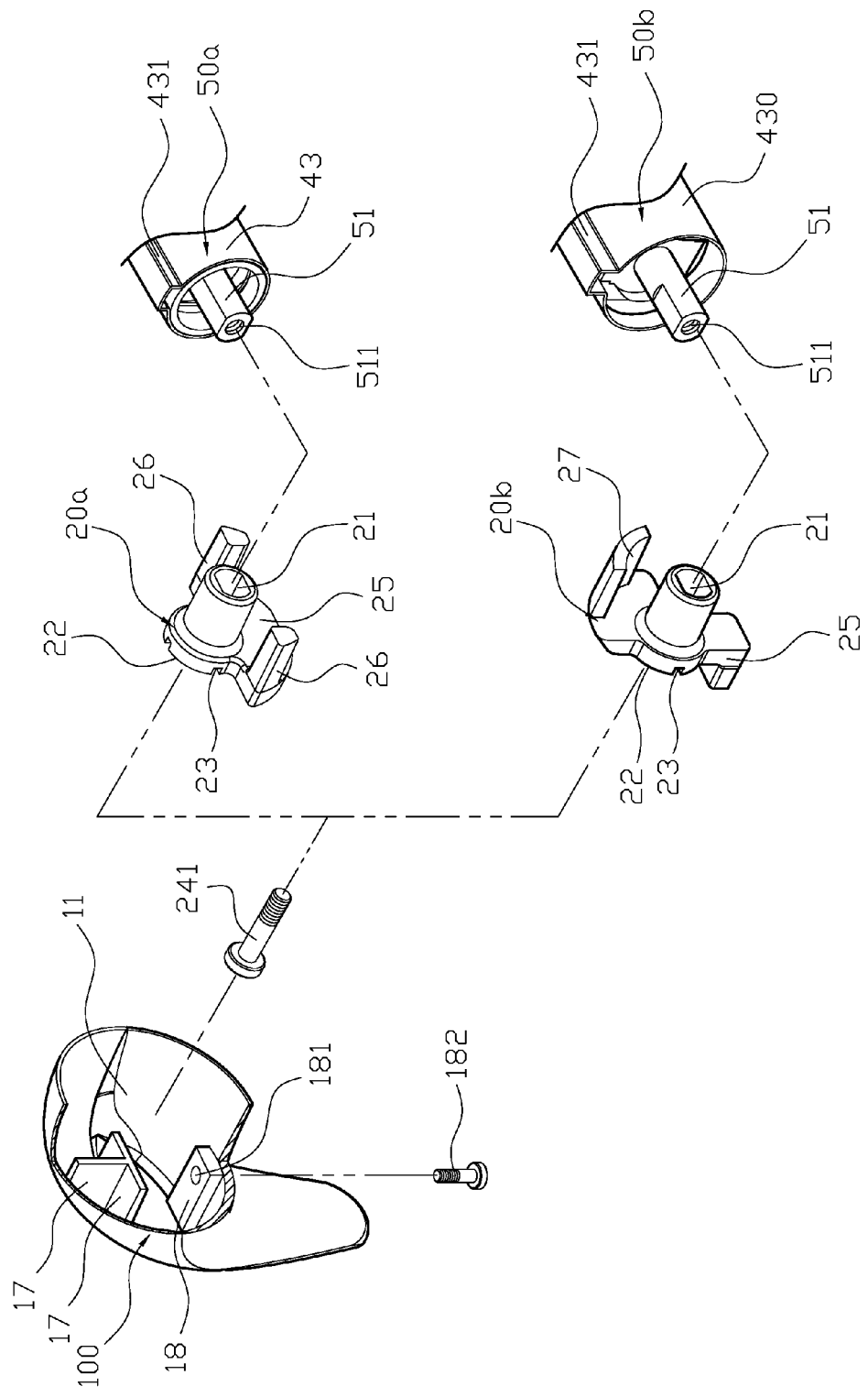
FIG. 17 illustrates an exploded view for the assembly of the second control handle in the present invention.

Referring to FIGS. 3, 4 and 6, when the control handle (10) is conjugated with the larger water control valve (50b), the larger positioning sleeve (430) is used to cover the valve body of the water control valve (50b), so that the blocking rib (431) of the positioning sleeve (430) is engaged with the stopping protruding rib (52) of the water control valve (50b). Also, the hollow opening (413) covers the outer periphery of the water control valve (50b) and the larger adjusting sheet (420) is connected to the receiving slot (412) of the connecting panel (41), such that the connecting panel (41) can be used for larger water control valve (50b). Finally, the connecting panel (41) is mounted to the wall surface (A) to complete the assembly of the panel set (40) (see FIG. 7 as well). Referring to FIGS. 3 and 12, the gasket (132) is disposed at the plugging slot (131) of the control handle (10) that is then plugged into the valve stick (51) of the water control valve (50b), and the locking unit (151) is inserted through the anti-loosening gasket (152) and the through hole (15) of the control handle (10), and is securely locked at the connecting groove (511) of the valve stick (51). The cover (16) is used to cover the trough (14) of the control handle (10) to complete the assembly for the water control valve (50b) with larger size. When the control handle (10) is rotated, it can drive the valve stick (51) to rotate to achieve the goal of controlling the temperature of the water flow. Moreover, when the protruding rib (111) of the control handle (10) is against the blocking rib (431) of the positioning sleeve (430), it can be secured at the stopping protruding rib (52) of the water control valve (50b) to achieve the purpose of blocking (see FIG. 14 as well), so as to control the rotating angle of the control handle (10) as well as the water control valve (50b) with larger size. Also referring to FIG. 3, if the user wants to further control the rotating angle of the control handle (10), the restricting device (30) can be assembled before assembling the control handle (10) (see FIG. 12), wherein the blocking rib (431) of the positioning sleeve (430) slides into the wedging rib (311) of the sleeve (31) of the restricting device (30), so that the supporting surface (322) of the sleeve (31) is against the opening end of the positioning sleeve (430). The restricting unit (32) is further inserted into the inner gear ring (312) of the sleeve (31) via the outer gear ring (321) to engage with each other to complete the assembly (see FIG. 15 as well), so that the relative position between the stopping block (323) and the wedging rib (311) can be adjusted by the engaging position (see FIG. 16). When the control handle (10) is rotated, the protruding rib (111) can be against the stopping block (323) of the restricting unit (32) and the wedging rib (311) of the sleeve (31) to reduce the rotating angle of the control handle (10), and further achieve the purpose of reducing the water flow to the maximum extent. This design can also prevent the control handle from overly rotating which may cause overly high water temperature and water flow, to further achieve the goal of water saving and avoiding burns.

Figure 18:
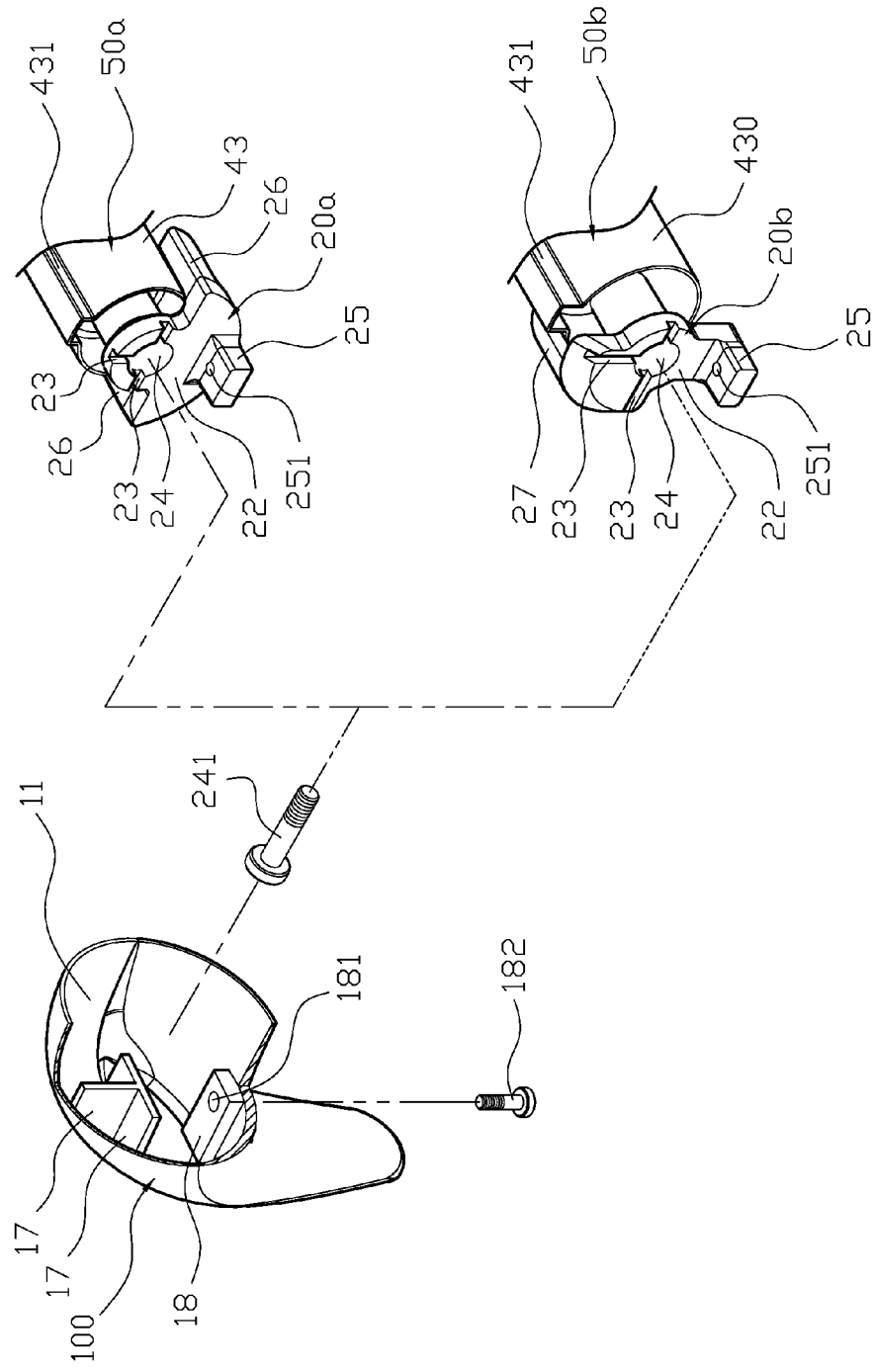
FIG. 18 illustrates a second exploded view for the assembly of the second control handle in the present invention.
Figure 19:
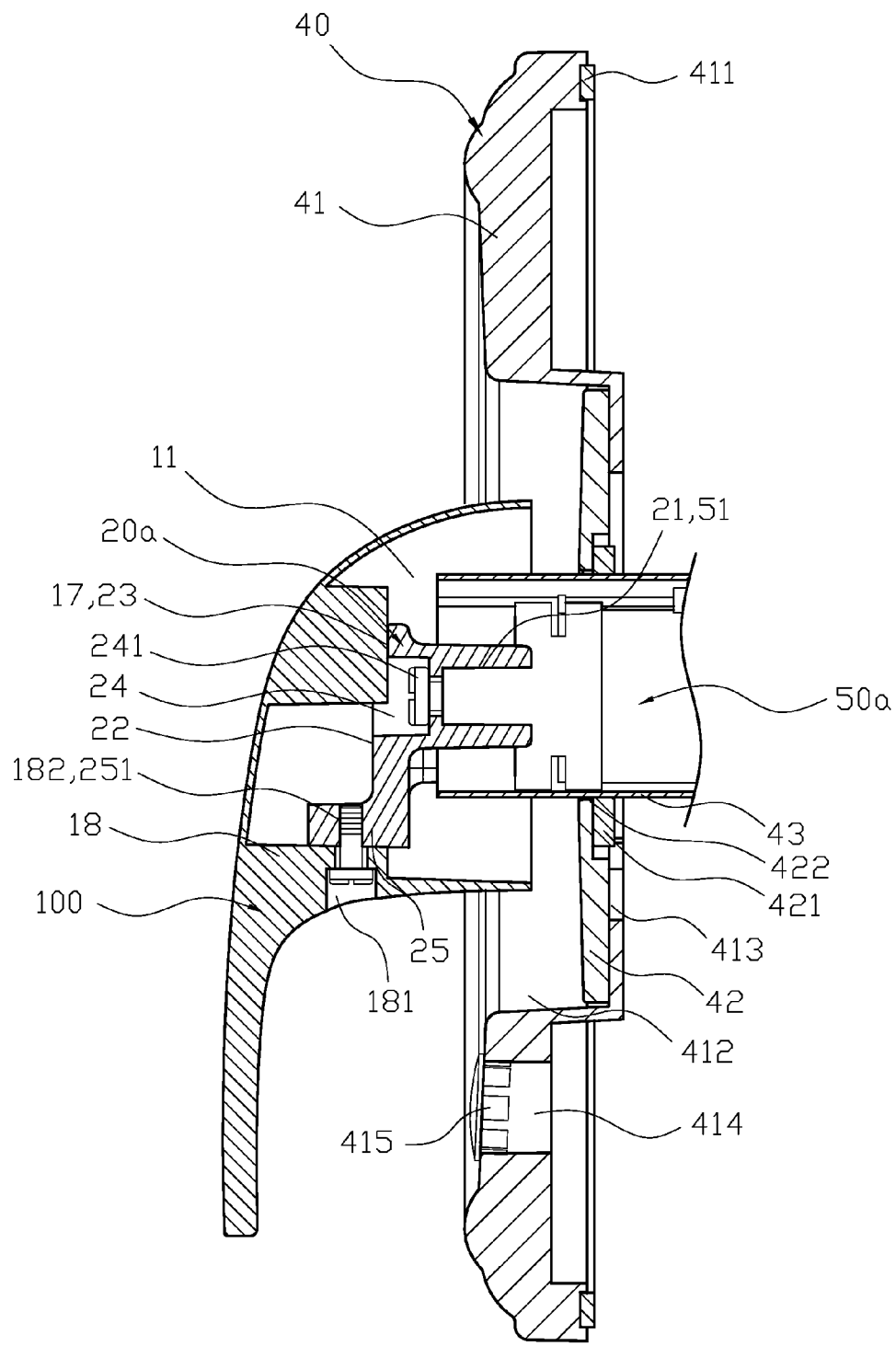
FIG. 19 illustrates a sectional view of the fourth assembly type in the present invention.
Figure 20:
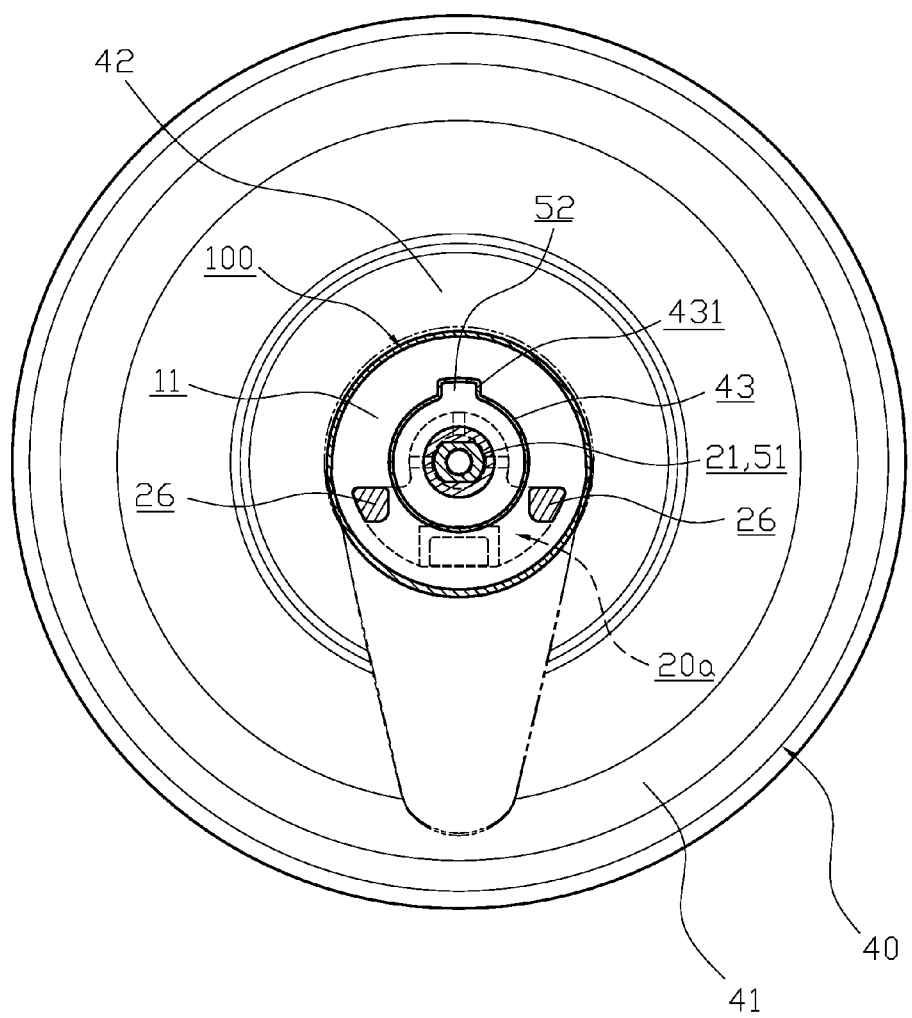
FIG. 20 illustrates a second sectional view of the fourth assembly type in the present invention.

Still referring to FIGS. 3, 5, 6 and 17, when the control handle (10) is configured to connect to the water control valve (50a) with smaller size, the smaller positioning sleeve (43) is used to cover the valve body of the water control valve (50a), so that the blocking rib (431) of the positioning sleeve (43) is engaged with the stopping protruding rib (52) of the water control valve (50a). Also, the hollow opening (413) covers the outer periphery of the water control valve (50a) and the smaller adjusting sheet (42) is connected to the receiving slot (412) of the connecting panel (41), such that the connecting panel (41) can be used for smaller water control valve (50a). Finally, the connecting panel (41) is mounted to the wall surface (A) to complete the assembly of the panel set (40) (see FIG. 7 as well). Referring to FIG. 18, the transforming head (20a) is used to cover the valve stick (51) of the water control valve (50a) through the inserting slot (21), and the screw locking unit (241) goes through the recessed slot (24) and is locked at the connecting groove (511) of the water control valve (50a). Moreover, the receiving space (11) of the control handle (10) covers the transforming head (20a), so that the wedging rib (17) of the second control handle (100) is engaged with the connecting slot (23) of the transforming head (20a) and the second through hole (181) of the connecting block (18) of the second control handle (100) is aligned with the connecting hole (251) of the connecting portion (25) of the transforming head (20a). The second locking unit (182) further goes through the second through hole (181) and is locked at the connecting hole (251) to complete the assembly (see FIG. 19 as well) and achieve the goal of the usage in smaller water control valve (50a). When the control handle (10) is rotated, it can drive the valve stick (51) to rotate to achieve the goal of controlling the temperature of the water flow. Also, when the stopping block (26) of the transforming head (20a) of the second control handle (100) is against the blocking rib (431) of the positioning sleeve (43), it can be secured at the stopping protruding rib (52) of the water control valve (50a) to achieve the purpose of blocking (see FIG. 20 as well), so as to control the rotating angle of the control handle (100) as well as the water control valve (50a) with smaller size.

Figure 21:
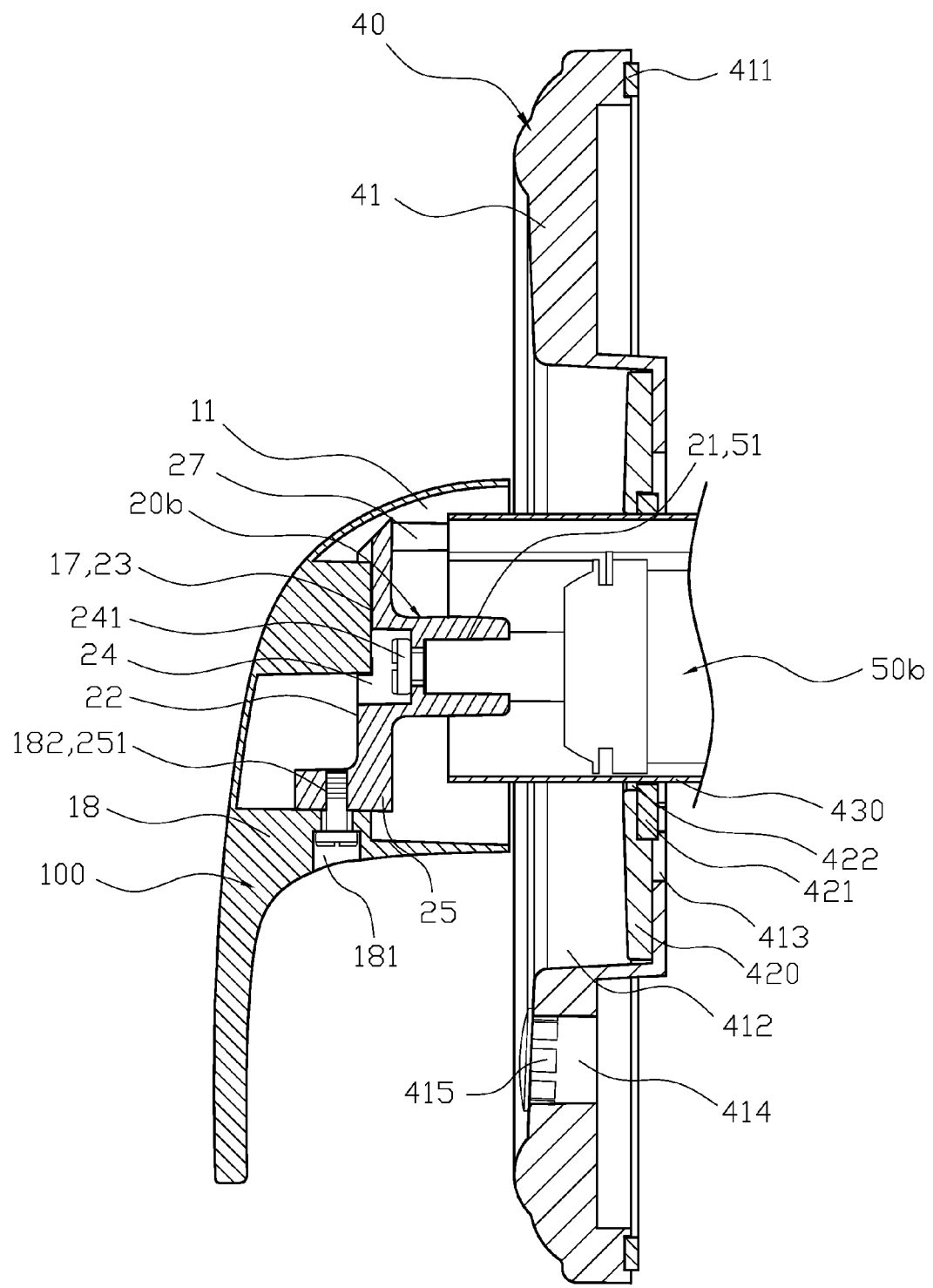
FIG. 21 illustrates a sectional view of the fifth assembly type in the present invention.
Figure 22:
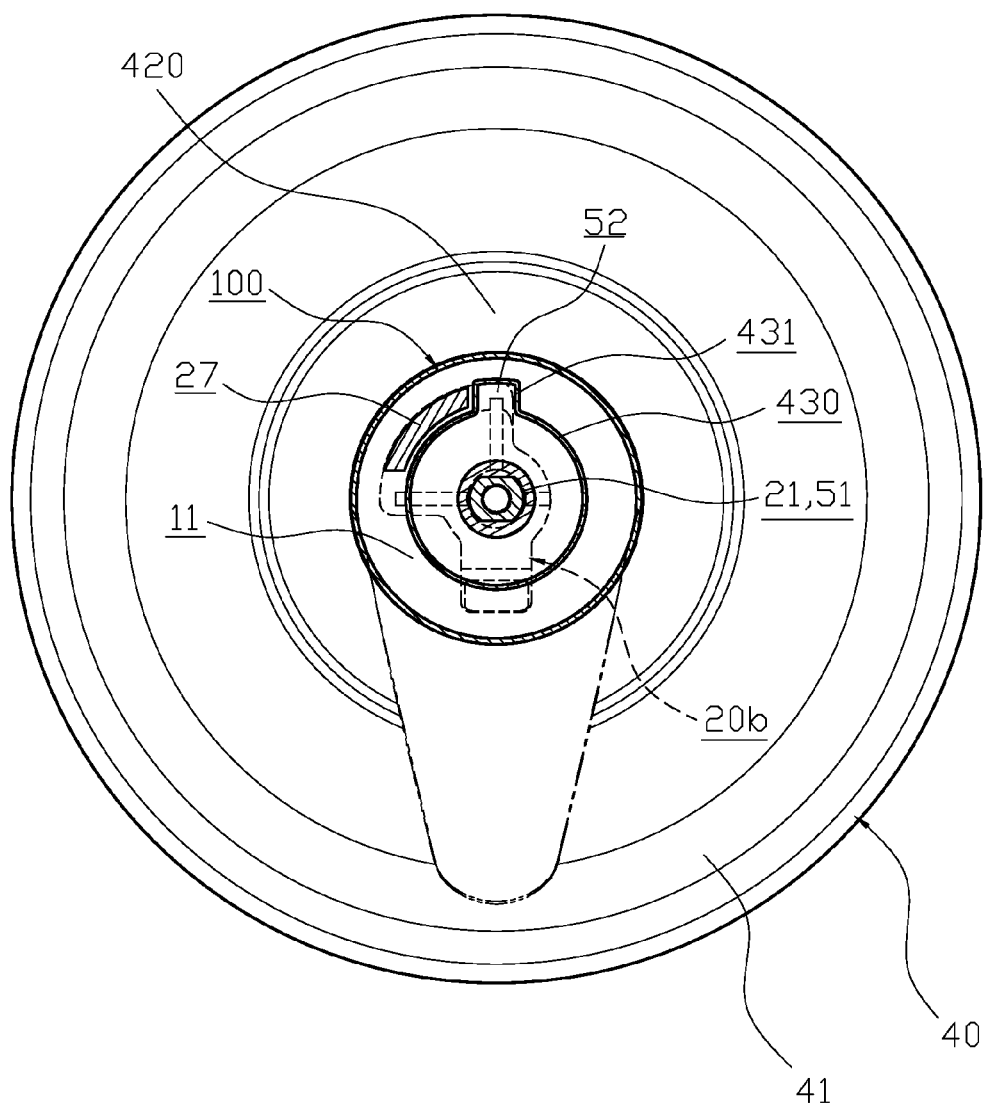
FIG. 22 illustrates a second sectional view of the fifth assembly type in the present invention.

Still referring to FIGS. 3, 5, 6 and 17, when the control handle (10) is conjugated with the larger water control valve (50b), the larger positioning sleeve (430) is used to cover the valve body of the water control valve (50b), so that the blocking rib (431) of the positioning sleeve (430) is engaged with the stopping protruding rib (52) of the water control valve (50b). Also, the hollow opening (413) covers the outer periphery of the water control valve (50b) and the larger adjusting sheet (420) is connected to the receiving slot (412) of the connecting panel (41), such that the connecting panel (41) can be used for larger water control valve (50b). Finally, the connecting panel (41) is mounted to the wall surface (A) to complete the assembly of the panel set (40). Referring to FIG. 18, the transforming head (20b) is used to cover the valve stick (51) of the water control valve (50b) through the inserting slot (21), and the screw locking unit (241) goes through the recessed slot (24) and is locked at the connecting groove (511) of the valve stick (51). Moreover, the receiving space (11) of the second control handle (100) covers the transforming head (20b), so that the wedging rib (17) of the second control handle (100) is engaged with the connecting slot (23) of the transforming head (20b), and the second through hole (181) of the connecting block (18) of the second control handle (100) is aligned with the connecting hole (251) of the connecting portion (25) of the transforming head (20b). The second locking unit (182) further goes through the second through hole (181) and is locked at the connecting hole (251) to complete the assembly (see FIG. 21 as well) and achieve the goal of the usage in larger water control valve (50b). When the second control handle (100) is rotated, it can drive the valve stick (51) to rotate to achieve the goal of controlling the temperature of the water flow. Also, when the stopping rib (27) of the transforming head (20b) of the second control handle (100) is against the blocking rib (431) of the positioning sleeve (43), it can be secured at the stopping protruding rib (52) of the water control valve (50b) to achieve the purpose of blocking (see FIG. 22 as well), so as to control the rotating angle of the control handle (100) as well as the water control valve (50b) with larger size.

According to the structure in the abovementioned embodiments, the present invention has the following advantages: (1) the receiving space (11) of the control handle (10) (100) having detachable transforming head (20a) (20b) and conversion block (12), and the panel set (40) having detachable adjusting sheets (42) (420) and positioning sleeves (43) (430), so the faucet control module in the present invention can be used in different water control valves (50a) (50b) with different sizes to increase the practicability of the faucet handle (10) (100) and the panel set (40), and further increase the convenience during assembly; and (2) when the control handle (100) is used for larger water control valve (50b), the restricting device (30) can be assembled before assembling the control handle (10), so that the relative position between the stopping block (323) and the wedging rib (311) can be adjusted by the engaging position of the outer gear ring (321) of the restricting unit (32) and the inner gear ring (312) of the sleeve (31). When the control handle (100) is rotated, the protruding rib (111) can be against the stopping block (323) of the restricting unit (32) and the wedging rib (311) of the sleeve (31) to reduce the rotating angle of the control handle (100), and further achieve the purpose of reducing the water flow to the maximum extent. This design can also prevent the control handle from overly rotating which may cause overly high water temperature and water flow, to further achieve the goal of water saving and avoiding burns.

Having described the invention by the description and illustrations above, it should be understood that these are exemplary of the invention and are not to be considered as limiting. Accordingly, the invention is not to be considered as limited by the foregoing description, but includes any equivalent

What is claimed is:
1. A wall-mounted faucet control module that is applied to different water control valves with different sizes, including:
two control handles, one side of which recessedly forms a receiving space having two protruding ribs spacedly located at the periphery of an opening thereof, so a conversion block is configured to form to enable the control handle to apply in a smaller water control valve, wherein two recessed slots are recessedly and spacedly formed at the periphery of the conversion block and the recessed slots are engaged with the protruding ribs of the control handle, and a connecting pole is protrudingly formed at the center of the receiving space and a plugging slot is formed near the connecting pole, wherein the other side of the control handle recessedly forms a first trough that has a through hole through an opening surface of the trough and connecting to the plugging slot, and the through hole has a locking unit, wherein the receiving space of the other control handle has two protruding wedging ribs cross each other at the opening end thereof, and has a connecting block protrudingly located at the periphery of the opening end, and the connecting block has a second through hole providing a second locking unit;

two transforming heads located at the receiving space of the control handle, and an inserting slot is recessedly formed at one side of the transforming heads, while a connecting surface is formed expandably at the other side, wherein two connecting slots cross with each other are recessedly formed at the connecting surface, and the connecting slots are engaged with the wedging ribs of a second control handle, and a recessed slot formed at the cross point of the connecting slots connects with the inserting slot and provides a screw locking unit, wherein the transforming heads extendedly and downward form a connecting portion that has a connecting hole therethrough, and the connecting hole is provided for the second locking unit of the second control handle to lock, and a stopping block is extendedly formed on both sides of the connecting portion of one transforming head, while a stopping rib is extendedly formed near the top of the inserting slot of the other transforming head;

a restricting device located at the receiving space of the control handle having a sleeve and a restricting unit, wherein the sleeve has a wedging rib protrudingly formed at the outer periphery of the sleeve, and an inner gear ring at the inner periphery of the sleeve, and an outer gear ring is formed at the periphery of one end of the restricting unit and engaged with the inner gear ring, wherein the other end of the restricting unit has a supporting surface expandably against the opening end of the sleeve, and a stopping portion is protrudingly formed at the periphery of the supporting surface, wherein the stopping portion is provided to be against the protruding ribs; and a panel set having a connecting panel and a number of adjusting sheets, wherein the connecting panel is connected to the wall surface, and has a receiving slot recessedly formed on one side with one hollow opening located at an opening surface of the receiving slot, while the adjusting sheets are connected to the receiving slot of the connecting panel and have a through opening for the valve body of the control valve to go through, and the through opening is different in size for the adjusting sheets, so the panel set is configured to use for valve body for control valves with different sizes, wherein the through opening provides two positioning sleeves with different sizes to cover the valve body of the control valve, and a blocking rib is protrudingly formed along the axial direction of the positioning sleeves.

2. The wall-mounted faucet control module of claim 1, wherein the receiving space has a plurality of positioning holes through an opening surface of the receiving space, and one side of the conversion block protrudingly forms a plurality of positioning poles which are used to plug into the positioning holes of the control handle.

3. The wall-mounted faucet control module of claim 1, wherein the plugging slot provides a gasket.

4. The wall-mounted faucet control module of claim 1, wherein a second trough is protrudingly formed at the other end of the control handle, and the through hole is located at an opening surface of the trough, and the trough provides a cover.

5. The wall-mounted faucet control module of claim 1, wherein an anti-loosening gasket is disposed between the locking unit and the through hole.

6. The wall-mounted faucet control module of claim 1, wherein a first gasket is located between the connecting panel and the wall surface.

7. The wall-mounted faucet control module of claim 6, wherein a through opening is formed near the periphery of the connecting panel and both sides of the through opening have a side cover and a second gasket.

8. The wall-mounted faucet control module of claim 7, wherein a third gasket is located between the connecting panel and the adjusting sheets.

\* \* \* \* \*